(12) United States Patent
Baranwal et al.

(10) Patent No.: US 10,090,769 B2
(45) Date of Patent: Oct. 2, 2018

(54) ISOLATED HIGH FREQUENCY DC/DC SWITCHING REGULATOR (71) Applicant: Texas Instruments Incorporated, Dallas, TX (US)

(72) Inventors: Shailendra Kumar Baranwal, Richardson, TX (US); Maurizio Granato, Milan (IT); Giovanni Frattini, Travaco' Siccomario (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/363,188

(22) Filed: Nov. 29, 2016

(65) Prior Publication Data

US 2018/0152109 A1 May 31, 2018

(51) Int. Cl.
*H02M 1/00* (2006.01)
*H02M 5/42* (2006.01)
(Continued)

(52) U.S. Cl.
CPC ....... *H02M 3/33515* (2013.01); *H02M 1/083* (2013.01)

(58) Field of Classification Search
CPC .. H02M 7/1557; H02M 7/1626; H02M 7/217; H02M 7/219
(Continued)

(56) References Cited

U.S. PATENT DOCUMENTS 5,414,609 A * 5/1995 Levran ................ H01F 27/2866
363/132
6,147,393 A 11/2000 Lommer
(Continued)

FOREIGN PATENT DOCUMENTS

JP 6-251995 9/1994

OTHER PUBLICATIONS

"Non-halogenated Low CTE BT Resin Laminate for IC Plastic Packages", MGC Mitsubishi Gas Chemical Company, Inc. pp. 1-5, available at www.jgc.co.jp/eng/products/Im/btprint/lineup/hfbt.html on Aug. 26, 2013.
(Continued)

*Primary Examiner* — Gary Nash
(74) *Attorney, Agent, or Firm* — Michael A. Davis, Jr.; Charles A. Brill; Frank D. Cimino (57) ABSTRACT

An electronic device, which includes an H-bridge circuit and a miniaturized transformer that is coupled to operate at VHF frequency, and a driver circuit for an n-type power transistor of the H-bridge circuit are disclosed. The driver circuit includes a first p-type transistor and an n-type transistor coupled between an upper rail and a lower rail, with an output taken between the drains of the first p-type transistor and the n-type transistor being coupled to a gate of the n-type power transistor. The driver circuit also includes a sample-and-hold capacitor coupled to capture a drain voltage for the first n-type power transistor on a first edge of a control signal for the first n-type power transistor and a comparator coupled to compare the captured drain voltage to a lower rail on a given edge of a clock signal and to provide a comparator value. The driver circuit also includes an up/down counter, which is coupled to receive the comparator value, to adjust a counter value responsive to receiving the comparator value and to output the counter value, and a first timing circuit that is coupled to receive the counter value and to send an adjustable pulse towards a gate of the first p-type transistor and a gate of the n-type transistor.

19 Claims, 5 Drawing Sheets

(51) Int. Cl.

| | | |
|---|---|---|
| *H02M 7/04* | (2006.01) | |
| *H02M 7/68* | (2006.01) | |
| *H02M 7/217* | (2006.01) | |
| *H02M 3/335* | (2006.01) | |
| *H02M 1/08* | (2006.01) | |

(58) Field of Classification Search
USPC .............................. 363/78, 79, 84, 89, 127
See application file for complete search history.

(56) References Cited

U.S. PATENT DOCUMENTS

| | | | |
|---|---|---|---|
| 6,456,511 | B1 | 9/2002 | Wong |
| 8,436,709 | B2 | 5/2013 | Fouquet et al. |
| 8,466,535 | B2 | 6/2013 | Hopper et al. |
| 8,674,418 | B2 | 3/2014 | Poddar et al. |
| 9,035,422 | B2 | 5/2015 | Khanolkar et al. |
| 2007/0058402 | A1* | 3/2007 | Shekhawat ............ H02M 1/42 363/89 |
| 2007/0188288 | A1 | 8/2007 | Ishii |
| 2009/0185397 | A1 | 7/2009 | Forghani-zadeh et al. |
| 2011/0199799 | A1* | 8/2011 | Hui ....................... H02M 7/219 363/127 |
| 2012/0002377 | A1 | 1/2012 | French et al. |
| 2012/0099345 | A1 | 4/2012 | Zhao et al. |
| 2013/0001735 | A1 | 1/2013 | Hopper et al. |
| 2013/0037908 | A1 | 2/2013 | Hopper et al. |
| 2013/0037909 | A1 | 2/2013 | French et al. |
| 2016/0006356 | A1* | 1/2016 | Nirantare ............... H02M 7/06 363/21.02 |
| 2016/0118904 | A1* | 4/2016 | Yoshikawa ........... H02M 7/217 363/17 |
| 2016/0149504 | A1 | 5/2016 | Quigley |
| 2016/0352237 | A1 | 12/2016 | Quigley |

OTHER PUBLICATIONS

"G200 BT/Epoxy Laminate and Prepreg", Isola Laminate Systems Corp., Data Sheet #5027/3/01, pp. 1-2, 1999.
"LTM2881 Complete Isolated RS485/RS422 uModule Transceiver + Power", Linear Technology Corporation, LT0213 Rev F, pp. 1-24, 2009.
David Krakauer, "Anatomy of a Digital Isolator", Analog Devices, Inc., Technical Article MS-2234, pp. 1-3, Oct. 2011.

\* cited by examiner

ISOLATED HIGH FREQUENCY DC/DC SWITCHING REGULATOR

FIELD OF THE DISCLOSURE

Disclosed embodiments relate generally to the field of integrated circuits. More particularly, and not by way of any limitation, the present disclosure is directed to an isolated high frequency DC/DC switching regulator.

BACKGROUND

An isolated DC-to-DC switching regulator or converter is an electronic circuit that converts a source of direct current (DC) from one voltage level to another without a galvanic connection between the input voltage domain and the output voltage domain. As overall system sizes shrink, miniaturization of DC/DC converters is required to fit within these systems. Inductive components are usually the bulkiest, and their size can be reduced by increasing the switching frequency as much as possible. Very High Frequency (VHF) switchers, operating in the range of 30~300 MHz, require very accurate timing for driving power stage switches and precise synchronization for driving power devices.

Implementation of DC/DC converters in the VHF range enables the usage of miniaturized high-frequency transformers which can fit inside a conventional silicon package and which may be integrated. Due to the lack of a galvanic connection between the input and the output voltage domains, any communication must be transmitted across an isolated communication system and is usually based on opto-couplers or high voltage capacitors. The use of isolated communications makes the synchronization between primary side inverter and the secondary side rectifier even more challenging due to the cost and delay added by the communication channel. For these reasons, generating timing on one side of the isolation barrier, e.g., the primary side, and transmitting the timing to the other side, e.g. the secondary side, can be expensive and challenging. Moreover, the primary side does not necessarily have all the information necessary to generate the correct timing for optimal behavior of the secondary side.

In addition, VHF switchers are burdened by very large switching losses. In order to minimize these losses, it is advisable to achieve soft switching on the power devices, which in several DC/DC topologies requires setting the ON time of the power devices based on circuit parameters, such as operating switching frequency, transformer inductance, resonance, capacitance, etc. In many instances, the knowledge of passive components parameters is not known when designing the driver for the DC/DC converter. Even in the case of a system-in-a-package, where values of the passive components are known, these parameters are heavily affected by manufacturing tolerances, which can easily vary by 30 percent in either direction.

SUMMARY

The disclosed embodiments provide adaptive timing control for ON time of power transistors in isolated, miniaturized DC/DC converters having miniaturized transformers. The timing solution is based on three concepts: a) timing synchronization based on a clock waveform recovered from the isolation transformer, b) fast turn ON in order to achieve soft switching at turn ON of the power device, and c) adaptive ON time control for proper turn OFF of the power device. Item a) is needed to generate a clock reference for the secondary side, which doesn't require an isolated communication channel. The instants of turn ON and turn OFF are based on the timing reference provided by the recovered clock.

In one aspect, an embodiment of a driver circuit for a first n-type power transistor in an H-bridge circuit, the H-bridge circuit comprising the first n-type power transistor and a second n-type power transistor, the H-bridge circuit coupled to first and second terminals of a miniaturized transformer that is coupled to operate at a very high frequency (VHF) is disclosed. The driver circuit includes a first p-type transistor and an n-type transistor coupled between an upper rail and a lower rail, an output taken between the drains of the first p-type transistor and the n-type transistor being coupled to a gate of the first n-type power transistor; a sample-and-hold capacitor coupled to capture a drain voltage for the first n-type power transistor on a first edge of a control signal for the first n-type power transistor; a comparator coupled to compare the captured drain voltage to a lower rail on a given edge of a clock signal and to provide a comparator value; an up/down counter coupled to receive the comparator value, to adjust a counter value responsive to receiving the comparator value and to output the counter value; and a first timing circuit coupled to receive the counter value and to send an adjustable pulse towards a gate of the first p-type transistor and a gate of the n-type transistor.

In another aspect, an embodiment of an electronic device is disclosed. The electronic device includes a miniaturized transformer configured to operate at a very high frequency (VHF) and having a first side and a second side, each of the first and second sides having a first terminal and a second terminal; a first H-bridge circuit on the first side of the transformer, the first H-bridge circuit comprising a first n-type power transistor having a drain coupled to the first terminal on the first side and a second n-type power transistor having a drain coupled to the second terminal on the first side; a first adaptive timing control circuit coupled to drive the first n-type power transistor; and a second adaptive timing control circuit coupled to drive the second n-type power transistor.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described. As used herein, the term "couple" or "couples" is intended to mean either an indirect or direct electrical connection unless qualified as in "communicably coupled" which may include wireless connections. Thus, if a first device couples to a second device, that connection may be through a direct electrical connection, or through an indirect electrical connection via other devices and connections.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 9:
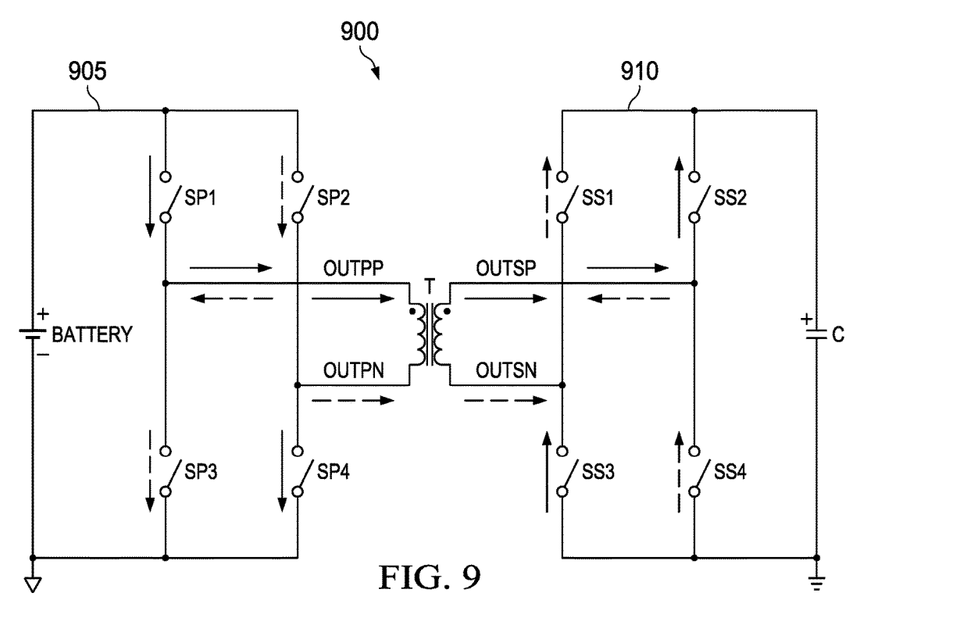
FIG. 9 depicts a schematic circuit diagram of an isolated DC-to-DC converter that uses an H-bridge configuration to operate transformer T.

Turning first to FIG. 9, a schematic circuit diagram of an isolated VHF DC-to-DC converter 900 is shown. VHF DC/DC converter 900 includes an H-bridge circuit 905 coupled to the primary side of transformer T, which in this implementation is integrated into the circuit, and an H-bridge circuit 910 coupled to the secondary side of transformer T. The H-bridge circuit 905 has a battery or other power source that is coupled to drive a direct current (DC) through switches SP1-4 in a manner that creates an alternating current (AC) through the primary side of transformer T. Specifically, switches SP1-4 are opened and closed such that in a first configuration, SP1 and SP4 are closed while SP2 and SP3 are opened, allowing current to flow in the direction shown by the solid arrows and in a second configuration, SP2 and SP3 are closed while SP1 and SP4 are opened, allowing current to flow in the direction shown by the arrows that are dotted lines. By alternating these two configurations, an AC current is created on the primary side of transformer T, which induces a current on the secondary side of transformer T.

As the AC current moves through the secondary side of transformer T, switches SS1-SS4 of H-bridge circuit 910 are controlled to rectify the current into a DC current that charges load capacitor C. Similarly to H-bridge circuit 905, in a first configuration, switches SS2 and SS3 are closed while SS1 and SS4 are opened to allow a positive current from OUTSP to flow as indicated by the solid arrows, then switches SS1 and SS4 are closed while SS2 and SS3 are opened to allow a positive current from OUTSN to flow as indicated by the arrows shown as dotted lines.

As mentioned previously, VHF DC/DC converters require soft switching to keep switching losses as low as possible. One example implementation of soft switching is to turn ON a set of switches on the primary side when the current through the channel of those switches is zero. Other examples include turning ON the switches when the drain/source voltage is zero and turning OFF the switches when the channel current is zero. In these examples, the losses associated with voltage and current overlap during the switching event are strongly mitigated. At the very high frequencies that are necessary to allow the transformer to be integrated, detecting that the voltage is zero and controlling the switches can be difficult. For example, if the DC/DC converter 900 is operating at 100 MHz, the clock period is ten nanoseconds, with SP1 and SP4 ON for five nanoseconds and SP2 and SP3 ON for five nanoseconds. If the circuit to detect a zero crossing has a five nanosecond delay, implementation of circuit feedback can be extremely difficult, can consume a large amount of power, or can be both difficult and consume large amounts of power. These disadvantages strongly limit the benefits provided by soft-switching. Implementation can be more difficult on the secondary H-bridge circuit 910, since there is no timing information provided by the primary H-bridge circuit 905, while the switches still need to be closed when the voltage across the switches is zero.

Prior art solutions have side-stepped these difficulties at VHF frequencies by driving the switches on the primary side with a fixed frequency oscillator with a center frequency that is tuned to the inductive and capacitive components and replacing switches on the secondary side with diodes. However, the use of diodes for passive rectification limits the efficiency of the circuit, based on the voltage drop across the diodes. Additionally, Schottky diodes, which are very fast and have a lower voltage drop, are not available in many silicon processes. In these instances, discrete components must be adopted, limiting the integration and miniaturization capabilities.

Figure 1:
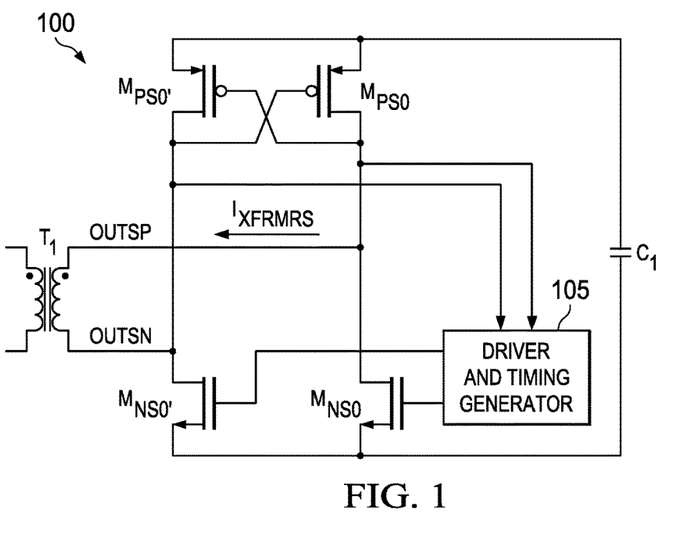
FIG. 1 depicts a generalized schematic drawing of a circuit that can be utilized on the secondary side of transformer $T_1$ according to an embodiment of the disclosure.

Turning now to FIG. 1, a generalized schematic drawing of a circuit 100 that can be used on the secondary side of a transformer $T_1$ is shown. In this embodiment, the H-bridge is implemented by two p-type metal oxide silicon (PMOS) power transistors $M_{PS0'}$, $M_{PS0}$ and two n-type metal oxide silicon (NMOS) power transistors $M_{NS0'}$, $M_{NS0}$. The drains of power transistors $M_{NS0'}$ and $M_{PS0'}$ are coupled together and to terminal OUTSN of transformer $T_1$. The source of power transistor $M_{PS0'}$ is coupled to a first terminal of load capacitor $C_1$ and the source of power transistor $M_{NS0'}$ is coupled to a second terminal of load capacitor $C_1$. Similarly the drains of power transistors $M_{NS0}$ and $M_{PS0}$ are coupled together and to terminal OUTSP of transformer $T_1$. The source of power transistor $M_{PS0}$ is coupled to the first terminal of load capacitor $C_1$ and the source of $M_{NS0}$ coupled to the second terminal of load capacitor $C_1$. Power transistor pair $M_{NS0}$ and $M_{PS0}$ are thus coupled in parallel with power transistor pair $M_{NS0'}$, $M_{PS0'}$. The gate of $M_{PS0}$ is coupled between the drains of $M_{PS0'}$ and $M_{NS0'}$ and the gate of $M_{PS0'}$ is coupled between the drains of $M_{PS0}$ and $M_{NS0}$, so that PMOS transistors $M_{PS0'}$ and $M_{PS0}$ are automatically controlled by the voltages of OUTSP and OUTSN respectively. Driver and timing generator 105 receives the voltages from OUTSP and OUTSN and turns NMOS power transistors $M_{NS0}$ and $M_{NS0'}$ ON and OFF based on the current and the drain voltages OUTSP and OUTSN.

Figure 2:
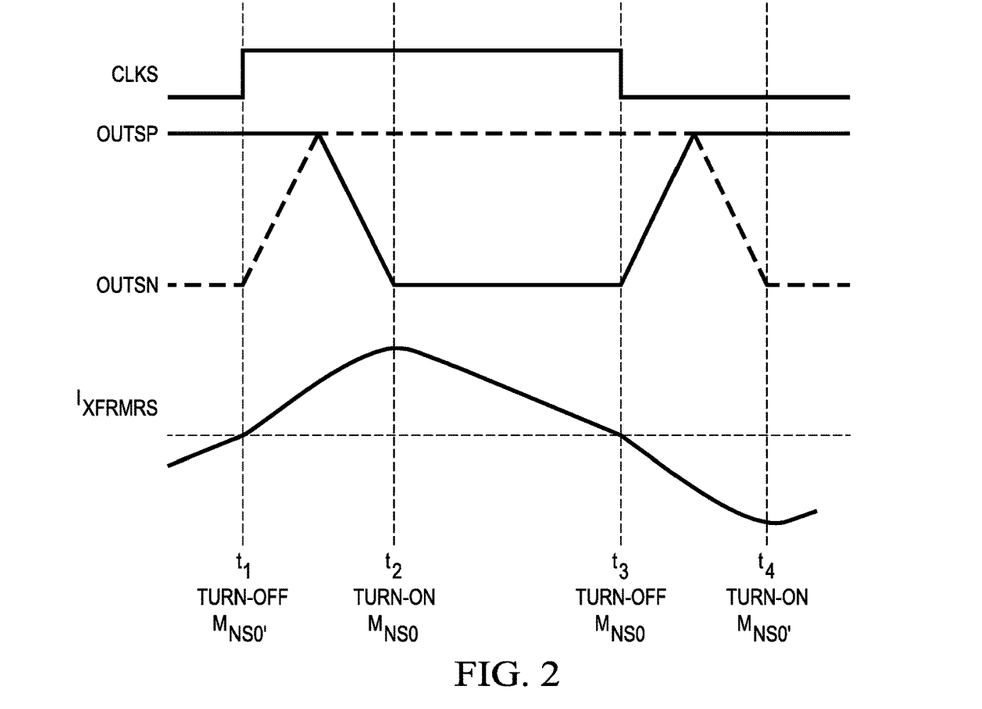
FIG. 2 depicts expected waveforms associated with the secondary side of transformer $T_1$ of FIG. 1 according to an embodiment of the disclosure.

FIG. 2 depicts the expected waveforms for the voltages on terminals OUTSP and OUTSN and the current $I_{XFRMRS}$ through the secondary coils of transformer $T_1$ over a partial clock cycle. Because no clock signal has been provided to circuit 100, a clock signal CLKS is recovered by detecting the zero crossings of the current $I_{XFRMRS}$ or the zero crossing of the voltage of OUTSP. At the start of the waveforms shown, transistor $M_{NS0'}$ is ON, coupling OUTSN to the second terminal of the load capacitor $C_1$ and holding the voltage on OUTSN low. Current $I_{XFRMRS}$ is flowing in the direction indicated by the arrow in FIG. 1. As the current reaches zero at time $t_1$, transistor $M_{NS0'}$ is turned OFF. Because of the inductance of the transformer $T_1$, the current will continue to flow in the same direction for a period of time after $M_{NS0'}$ is turned OFF, although the rate slows. The continuing flow of current causes the voltage on OUTSN to rise until it reaches the upper rail. When OUTSN reaches the upper rail, PMOS power transistor $M_{PS0}$ will be turned OFF, at which point the voltage on OUTSP starts to fall until it reaches the lower rail. As OUTSP falls and crosses the threshold of the PMOS transistor, $M_{PS0'}$ starts to conduct, coupling the voltage OUTSN to the positive rail with the lowest possible losses and hence enhancing the efficiency. When OUTSP reaches the lower rail at time $t_2$, transistor $M_{NS0}$ is completely turned ON and the flow of current $I_{XFRMRS}$ slows. Power transistor $M_{NS0}$ will be turned OFF as the current again crosses zero at time $t_3$ to allow the direction of flow of current $I_{XFRMRS}$ to be reversed. When $M_{NS0}$ is turned OFF, current $I_{XFRMRS}$ continues in the same direction for a period of time although the rate slows. The voltage on OUTSP starts to rise until OUTSP is at the upper rail, at which point OUTSN starts to fall towards the lower rail. When OUTSN reaches the lower rail at time $t_4$, power transistor $M_{NS0'}$ is turned ON. It can be seen that NMOS power transistor $M_{NS0}$ is turned ON when the drain voltage OUTSP is at zero, allowing zero voltage switching (ZVS), and that power transistor $M_{NS0}$ is turned OFF when the current is zero, allowing zero current switching (ZCS). Similarly, NMOS power transistor $M_{NS0'}$ is turned ON when the drain voltage OUTSN is zero and is turned OFF when the current is zero. The control of power transistors $M_{NS0}$, $M_{NS0'}$, however, is challenging at VHF switching frequencies because of the propagation delay of the internal circuits.

Figure 3:
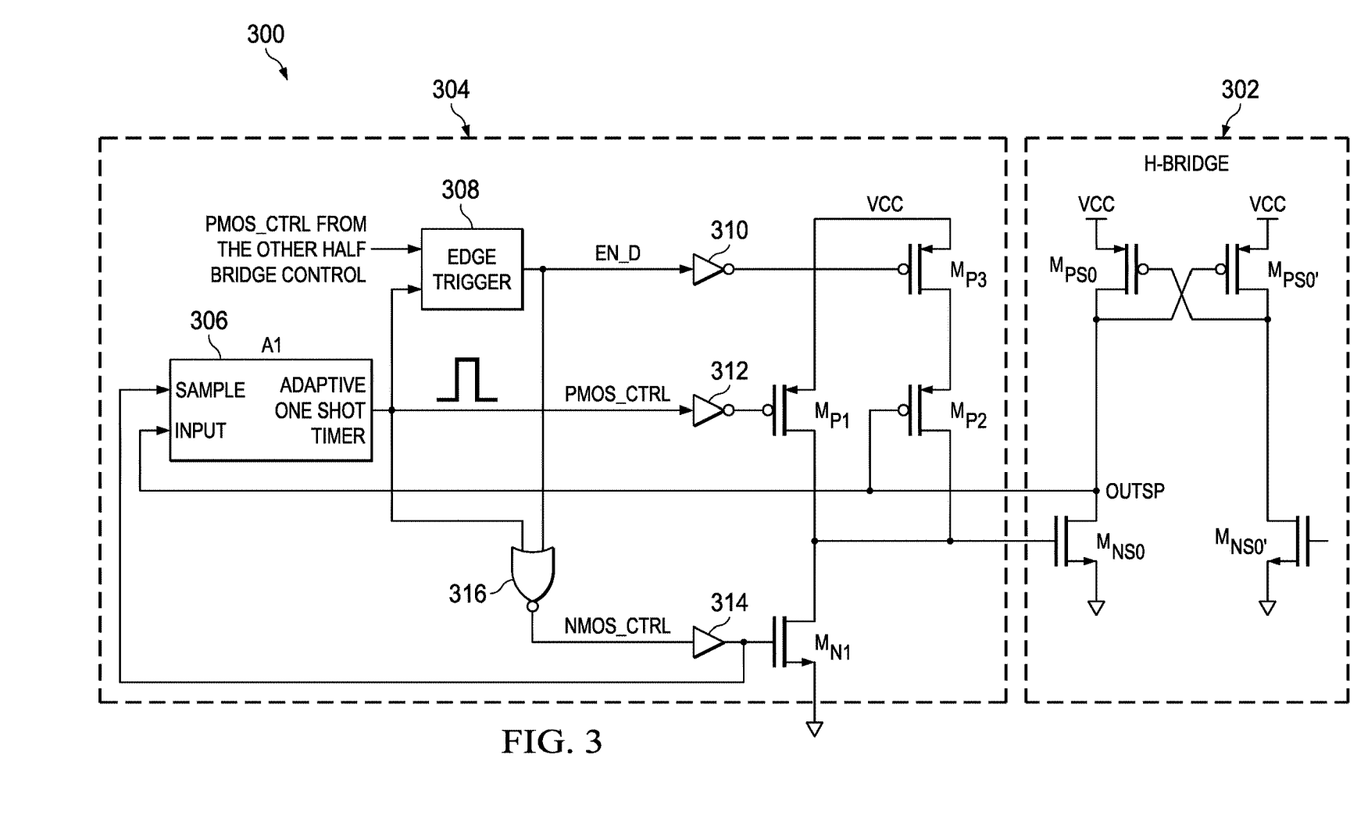
FIG. 3 depicts an example of a circuit that can be used on the secondary side of a transformer $T_1$ according to an embodiment of the disclosure.

FIG. 3 depicts an example of a circuit that can be used on the secondary side of a DC/DC converter according to an embodiment of the disclosure. Circuit 300 contains H-bridge circuit 302 and adaptive timing control circuit 304, which controls turning power transistor $M_{NS0}$ ON and OFF. Although not specifically shown, it will be understood that another adaptive timing circuit 304 is provided to control turning power transistor $M_{NS0'}$ ON and OFF. Adaptive timing control circuit 304 contains PMOS transistors $M_{P1}$, $M_{P2}$, $M_{P3}$ and NMOS transistor $M_{N1}$. Transistors $M_{P1}$ and $M_{N1}$ are coupled in series between the upper rail and the lower rail and are the main drivers for NMOS power transistor $M_{NS0}$, with the drive voltage for the gate of power transistor $M_{NS0}$ being taken between the drains of transistors $M_{P1}$ and $M_{ND}$. Turn ON of power transistor $M_{NS0}$ through transistor $M_{P1}$, however, is slow, so a faster turn ON path is provided by transistor $M_{P2}$. Transistors $M_{P2}$ and $M_{P3}$ are coupled in series between the upper rail and the gate of $M_{NS0}$. The gate of PMOS transistor $M_{P2}$ is coupled to the node OUTSP and, when enabled by transistor $M_{P3}$, provides fast turn ON of NMOS power transistor $M_{NS0}$ as soon as the voltage on OUTSP drops below the threshold of $M_{P2}$.

PMOS transistor $M_{P1}$ and NMOS transistor $M_{N1}$ are each controlled in part or in total by a signal PMOS_CTRL from adaptive one shot timer 306, which ensures that power transistor $M_{NS0}$ turns OFF when the current through transformer $T_1$ is zero and also ensures an ON duration of $M_{NS0}$ that achieves zero current switching by adjusting the turn ON time of power transistor $M_{NS0}$. Transistor $M_{P1}$ is coupled to adaptive one shot timer 306 through inverter/driver circuit 312 and transistor $M_{N1}$ is coupled to adaptive one shot timer 306 through logic gate 316 and driver circuit 314. PMOS transistor $M_{P3}$ is controlled by edge trigger circuit 308 and is coupled to edge trigger circuit through inverter/driver circuit 310. Edge trigger circuit is coupled to receive the signal PMOS_CTRL from adaptive one shot timer 306 and is also coupled to receive the signal PMOS_CTRL', which is provided by a similar circuit 300 that controls NMOS power transistor $M_{NS0'}$. Adaptive one shot timer 306 is coupled to receive both the voltage on OUTSP and the signal that turns ON transistor $M_{N1}$.

As noted previously, at the VHF frequencies at which the disclosed circuit is designed to operate, it can be extremely difficult to design a feedback loop that is fast enough to provide instantaneous correction of any errors in the timing. The disclosed circuit provides a slower feedback loop that corrects errors in timing over a period of several cycles. As will be explained in FIG. 4, adaptive one shot timer 306 captures the value of the drain of power transistor $M_{NS0}$, i.e. OUTSP, at the instant that NMOS transistor $M_{N1}$ is turned ON in order to pull the gate of NMOS power transistor $M_{NS0}$ low and turn $M_{NS0}$ OFF. By capturing the voltage at OUTSP, adaptive one shot timer 306 can determine whether power transistor $M_{NS0}$ was turned on when the current was zero and can correct the timing as necessary.

Adaptive one shot timer 306 provides the signal PMOS_CTRL to edge trigger circuit 308 and sends PMOS_CTRL towards transistors $M_{P1}$ and $M_{N1}$. In the disclosed embodiment, PMOS_CTRL provides a high pulse when power transistor $M_{NS0}$ is to be turned ON. The pulse on PMOS_CTRL is inverted by inverter/driver 312 and turns ON PMOS transistor $M_{P1}$ to pull the gate of power transistor $M_{NS0}$ high and turn the power transistor $M_{NS0}$ ON. Edge trigger 308 receives both PMOS_CTRL, which is used to turn ON power transistor $M_{NS0}$, and PMOS_CTRL', which is used to turn ON power transistor $M_{NS0'}$. Edge trigger circuit 308 is triggered by the edge of these signals; the enable signal EN_D will be turned ON when PMOS_CTRL' turns OFF and will be turn OFF when PMOS_CTRL turns ON.

Logic gate 316, which in the disclosed embodiment is a NOR gate, receives enable signal EN_D and control signal PMOS_CTRL. When both of these signals are low, i.e., when both $MP_1$ and $MP_3$ are turned OFF, NMOS transistor $M_{N1}$ is turned ON; otherwise transistor $M_{N1}$ is turned OFF. PMOS transistor $M_{P2}$, when enabled by transistor $M_{P3}$, will turn ON as soon as the voltage on OUTSP crosses zero and becomes negative. MP2 thus provides a quick turn ON of power transistor $M_{NS0}$, since the control loop to turn ON power transistor $M_{NS0}$ is too slow to be effective. Once transistor $M_{P1}$ is enabled, however, transistor $M_{P3}$ is turned OFF, preventing $M_{P2}$ from providing any further current to charge $M_{NS0}$. Accordingly, transistor $M_{P3}$ is only ON long enough to start turning ON NMOS transistor $M_{NS0}$ prior to the time that transistor $M_{P1}$ is ON. There will be some overlap in the time that $M_{P1}$ and $M_{P3}$ are turned ON.

Figure 4:
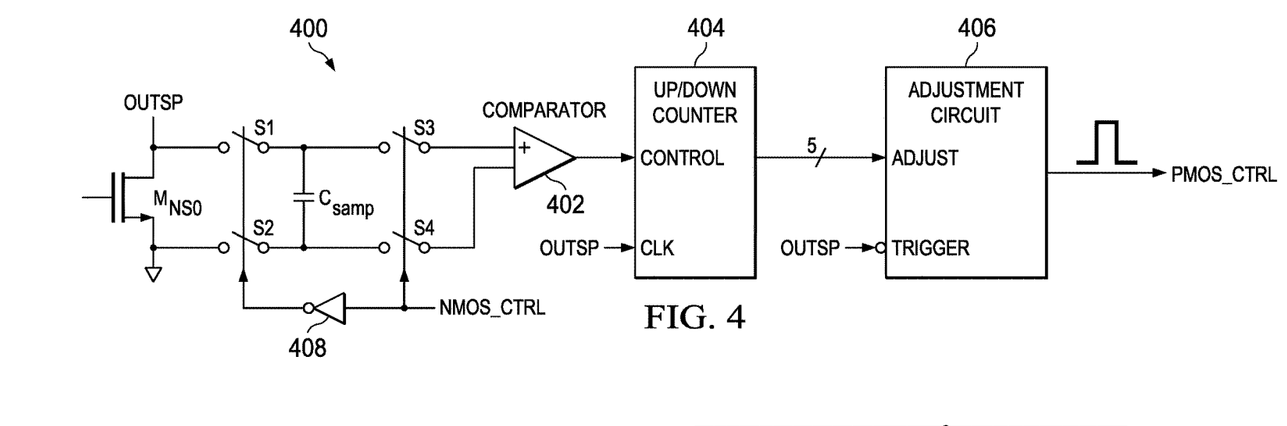
FIG. 4 depicts an example of an adaptive one-shot timer according to an embodiment of the disclosure.

FIG. 4 depicts a circuit 400 that in one embodiment serves as the adaptive one shot timer 306. In circuit 400, sampling capacitor $C_{SAMP}$ is coupled to receive the source voltage and the drain voltage from NMOS power transistor $M_{NS0}$, i.e., OUTSP and the lower rail. If the timing is correct, then the voltage on OUTSP should be equal to the lower rail when this switching occurs. If the timing is not correct, the voltage on OUTSP provides an indication of the current direction during turn OFF of $M_{NS0}$, which will be either positive or negative, depending on whether transistor $M_{N1}$ was turned OFF too early or too late. Switches S1-S4 are controlled by signal NMOS_CTRL, which is used to control NMOS transistor $M_{N1}$. When transistor $M_{P2}$ is turned ON followed by $M_{P1}$, which turns ON power transistor $M_{NS0}$, the voltage across $M_{NS0}$ is captured across $C_{SAMP}$ by closing the switches S1 and S2 and opening the switches S3 and S4. Then when transistor $M_{N1}$ is turned ON, the value of the voltage $C_{SAMP}$ is provided to comparator 402 by opening switches S1 and S2 and closing switches S3 and S4. Comparator 402 acts as an error indicator and is controlled by the input values provided. Comparator 402 provides a comparison value to up/down counter 404. The comparator 402 can be a slow comparator that takes a few switching cycles of $M_{NS0}$ to make the comparison. This can be achieved by keeping the switch S3-S4 closed and S1-S2 open for those few switching cycles. On the clock signal recovered from OUTSP, up/down counter 404 either increments or decrements Depending on the comparator output. Comparator 402 in combination with up/down counter 404 acts as an error integrator. The value of the up/down counter 404 is then provided to adjustment circuit 406, which adjusts the length of time that a high pulse will be provided on control signal PMOS_CTRL and determines when to turn the pulse OFF. The value of OUTSP is used to turn OFF the pulse on PMOS_CTRL when OUTSP is zero. Over a few cycles, adaptive one shot timer 400 ensures that power transistor $M_{NS0}$ turns OFF when the current across power transistor $M_{NS0}$ is close to zero.

Figure 5:
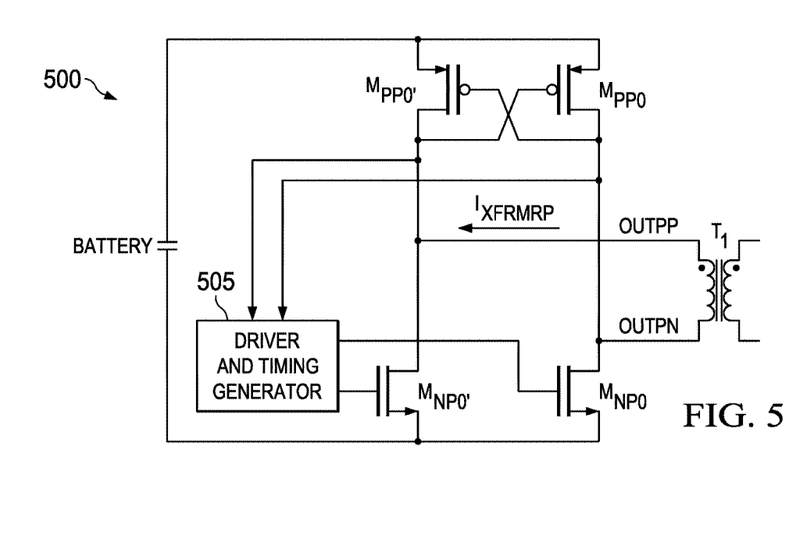
FIG. 5 depicts a generalized schematic drawing of a circuit that can be utilized on the primary side of transformer $T_1$ according to an embodiment of the disclosure.

Control of the NMOS transistors on the primary side of transformer $T_1$ can be handled in a similar manner, with one difference. On the secondary side, turning the NMOS transistors OFF is timed to the zero crossing of $I_{XFRMRS}$; on the primary side, turning the NMOS transistors ON is timed to the zero crossing of $I_{XFRMRP}$. FIG. 5 depicts a generalized schematic drawing of a circuit 500 that can be used on the primary side of a transformer $T_1$. An H-bridge circuit is again implemented by two PMOS power transistors $M_{PP0'}$, $M_{PP0}$ and two NMOS power transistors $M_{NP0'}$, $M_{NP0}$. The drains of power transistors $M_{NP0'}$ and $M_{PP0'}$ are coupled together and to terminal OUTPP of transformer $T_1$. The source of power transistor $M_{PP0'}$ is coupled to the upper rail and the source of power transistor $M_{NP0'}$ is coupled to the lower rail of a battery or other power supply. Similarly the drains of power transistors $M_{NP0}$ and $M_{PP0}$ are coupled together and to terminal OUTPN of transformer $T_1$. The source of power transistor $M_{PP0}$ is coupled to the upper rail and the source of power transistor $M_{NP0}$ is coupled to the lower rail of the power supply. Power transistor pair $M_{NP0}$ and $M_{PP0}$ is thus coupled in parallel with power transistor pair $M_{NP0'}$, $M_{PP0'}$. The gate of power transistor $M_{PP0}$ is coupled between the drains of power transistors $M_{PP0'}$ and $M_{NP0'}$ and the gate of power transistor $M_{PP0'}$ is coupled between the drains of power transistors $M_{PP0}$ and $M_{NP0}$, so that PMOS power transistors $M_{PP0'}$ and $M_{PP0}$ are automatically controlled by the voltages of OUTPN and OUTPP respectively. Driver and timing generator 505 receives the voltages from OUTPN and OUTPP and generates respective control signals for $M_{NP0}$ and $M_{NP0'}$.

Figure 6:
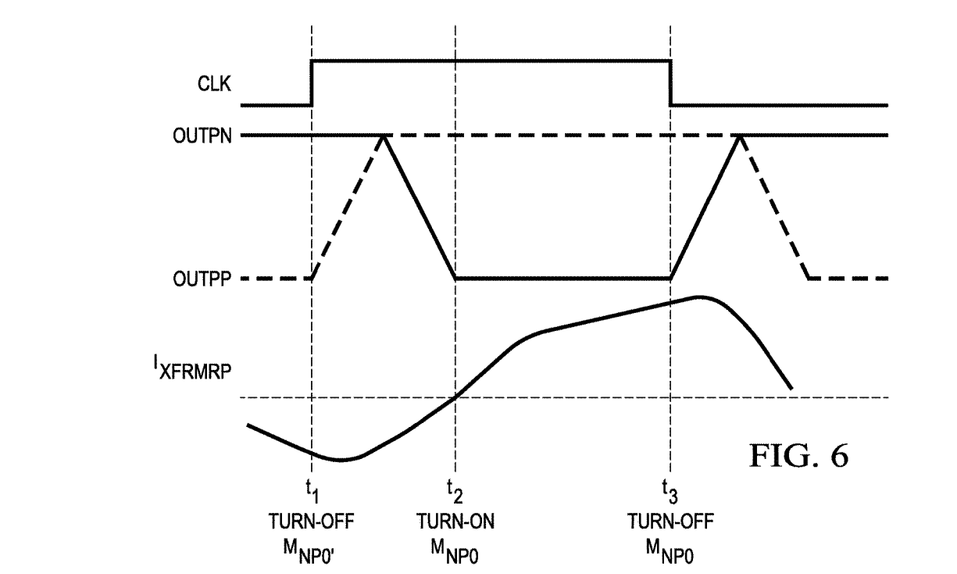
FIG. 6 depicts expected waveforms associated with the primary side of transformer $T_1$ according to an embodiment of the disclosure.

FIG. 6 depicts the expected waveforms for the voltages on OUTPN and OUTPP and the current $I_{XFRMRP}$ through the primary coils of transformer $T_1$ over a partial clock cycle. As the waveforms start, transistor $M_{NP0'}$ is ON, coupling OUTPP to the lower rail and holding the voltage on OUTPP low. Current $I_{XFRMRP}$ is flowing in the direction indicated by the arrow shown in FIG. 5. At time $t_1$, NMOS power transistor $M_{NP0'}$ is turned OFF on the rising edge of clock signal CLK, which is provided to the circuit. Because of the inductance of the transformer $T_1$, the current will continue to flow in the same direction after power transistor $M_{NP0'}$ is turned OFF. The continued flow of current causes the voltage on OUTPP to begin to rise until it reaches the upper rail. When OUTPP reaches the upper rail, PMOS power transistor $M_{PP0}$ will be turned OFF, at which point the voltage on OUTPN starts to fall until it reaches the lower rail. As soon as the voltage OUTPN falls one PMOS threshold voltage below the upper rail, the power PMOS $M_{PP0'}$ is turned on, coupling the voltage OUTPP to the positive rail with the lowest possible losses. During this time, current $I_{XFRMRP}$ is slowing towards zero. As the current reaches zero at time $t_2$, power transistor $M_{NP0}$ is turned ON to provide zero current switching. When power transistor $M_{NP0}$ is turned ON, the current $I_{XFRMRP}$ begins to move in the opposite direction. Transistor $M_{NP0}$ will be turned OFF at time $t_3$ by the falling edge of clock signal CLK. The ON time for power transistor $M_{NP0}$ is not known a priori, especially if the switching frequency is not fixed. Achieving proper control of power transistor $M_{NP0}$ is challenging at VHF switching frequencies because of the propagation delay of the internal circuits.

Figure 7:
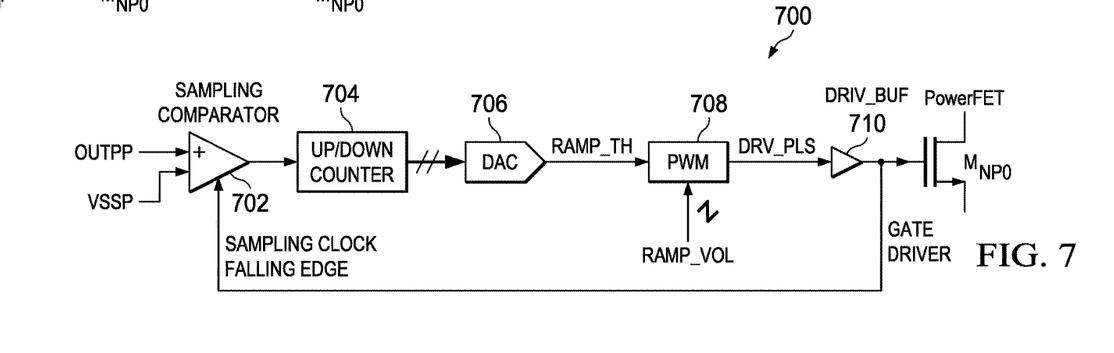
FIG. 7 depicts an example control circuit for an NMOS power transistor in an H-bridge circuit according to an embodiment of the disclosure.

FIG. 7 depicts a circuit 700 that can serve to drive one of the NMOS power transistors in the H-bridge circuit of FIG. 5, which in this example is power transistor $M_{NP0}$. The drain voltage of power transistor $M_{NP0}$ is measured right after turn ON, so that the voltage is proportional to the drain current. Based upon the voltage (i.e. the current) being positive or negative, the OFF time of power transistor $M_{NP0}$ is adjusted in order to get closer to zero current turn ON in the next cycle. Circuit 700 includes sampling comparator 702, which receives the signals OUTPP and VSSP and is timed by the falling edge of the signal DRV_PLS used to turn power transistor $M_{NP0}$ ON and OFF. Thus, sampling comparator 702 captures the voltage across NMOS power transistor $M_{NP0}$ when power transistor $M_{NP0}$ is turned ON. As on the secondary side, the captured voltage can identify whether power transistor $M_{NP0}$ was turned ON at the moment of zero crossing, too early or too late. Sampling comparator 702 is coupled to provide the captured voltage to up/down counter 704, which increments or decrements a timing counter according to the captured voltage. In one embodiment, which is shown in FIG. 7, the adjustment circuit 406 that is shown in FIG. 4 is implemented using a digital-to-analog converter (DAC) 706 and pulse wave modulator (PWM) 708. Up/down counter 704 is coupled to provide the timing counter to DAC 706. DAC converts the digital counter into an analog signal, RAMP_TH, and is coupled to provide signal RAMP_TH to PWM 708. PWM 708 is coupled to receive both RAMP_TH and a signal RAMP_VOL. RAMP_VOL provides a voltage that ramps up at a constant rate and is reset by the clock signal CLK. In the embodiment whose signals are shown in FIG. 6, RAMP_VOL is reset on the falling edge of CLK. PWM 708 utilizes the signals RAMP_VOL and RAMP_TH to produce a drive pulse DRV_PLS to drive NMOS power transistor $M_{NP0}$, as will be shown in FIG. 8. PWM 708 is coupled to provide DRV_PLS to drive buffer DRV_BUF 710, which is coupled to control the gate of NMOS power transistor $M_{NP0}$. Although not specifically shown, DRV_BUF 710 includes a PMOS transistor and an NMOS transistor coupled between the upper and lower rails and providing the control signal for NMOS power transistor $M_{NP0}$ at the coupled drains of the PMOS transistor and NMOS transistor. A feedback loop provides DRV_PLS to sampling comparator 702. Although not specifically shown, it will also be understood that a second circuit 700 is used to drive the gate of NMOS power transistor $M_{NP0'}$ using on the signal OUTPN.

Figure 8:
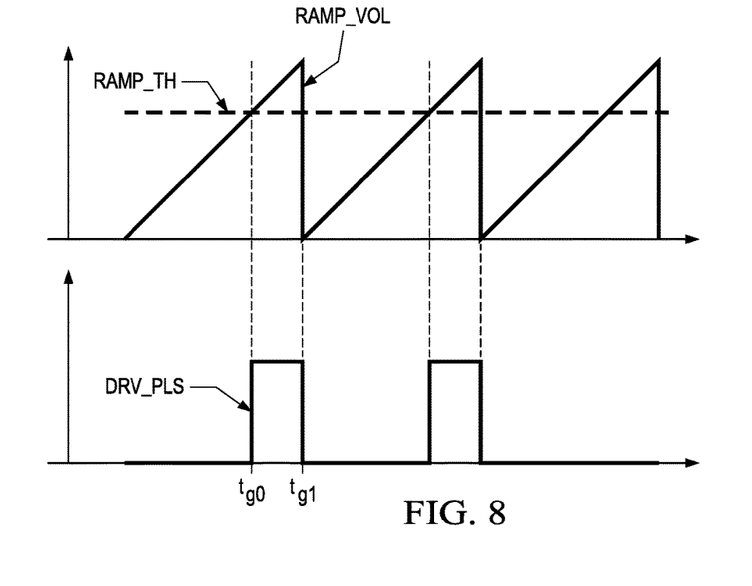
FIG. 8 depicts example waveforms associated with the PWM of FIG. 7 according to an embodiment of the disclosure.

FIG. 8 depicts the signals provided to PWM 702 and the drive pulse produced by PWM 702. As noted above, ramping voltage RAMP_TH is a voltage that ramps up at a constant rate and is reset at time $t_{g0}$ by an edge of clock CLK, which can have either a fixed or variable frequency. Signal DRV_PLS is turned ON at time $t_{g0}$ when RAMP_VOL is equal or greater than RAMP_TH and is turned OFF again at time $t_{g1}$ when RAMP_VOL is reset to zero. This means that by changing RAMP_TH, the turn ON time of NMOS power transistor $M_{NP0}$ can be adaptively adjusted to drive NMOS power transistor $M_{NP0}$.

The disclosed embodiments provide an isolated VHF DC/DC converter having a miniaturized transformer. The isolated VHF DC/DC converter can provide one or both of primary side adaptive timing and secondary side adaptive timing. The adaptive timing enables a variable frequency and hence allows spread spectrum modulation to reduce both conducted and radiated noise. Timing on the secondary side of the transformer is recovered from the transformer signal. The adaptive timing circuit captures the drain voltage for the associated power transistor at the instant the control circuit for the power transistor is turned ON (for the primary side) or is turned OFF (for the secondary side). The drain voltage is used to determine whether the power transistor was switched at the correct instant to provide the desired zero current switching and if not, is used to adjust the switching time to correct the timing. Over a number of cycles, the disclosed circuit can provide effective adjustments, including to a varying frequency.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A driver circuit for a first n-type power transistor in an H-bridge circuit, the H-bridge circuit comprising the first n-type power transistor and a second n-type power transistor, the H-bridge circuit coupled to first and second terminals of a miniaturized transformer that is coupled to operate at a very high frequency (VHF), the driver circuit comprising:
    a first p-type transistor and an n-type transistor coupled between an upper rail and a lower rail, an output taken between the drains of the first p-type transistor and the n-type transistor being coupled to a gate of the first n-type power transistor;
    a sample-and-hold capacitor coupled to capture a drain voltage for the first n-type power transistor on a first edge of a control signal for the first n-type power transistor;
    a comparator coupled to compare the captured drain voltage to a lower rail on a given edge of a clock signal and to provide a comparator value;
    an up/down counter coupled to receive the comparator value, to adjust a counter value responsive to receiving the comparator value and to output the counter value; and
    a first timing circuit coupled to receive the counter value and to send an adjustable pulse towards a gate of the first p-type transistor and a gate of the n-type transistor.

2. The driver circuit as recited in claim 1 wherein the first timing circuit comprises:
    a digital-to-analog converter coupled to receive the counter value and to provide a ramp threshold; and
    a pulse wave modulator coupled to receive the ramp threshold and the clock signal, to reset a ramping voltage on the given edge of the clock signal and to turn ON the adjustable pulse only while the ramping voltage is greater than the threshold.

3. The driver circuit as recited in claim 2 wherein the clock signal is received from a clock.

4. The driver circuit as recited in claim 1 further comprising:
    a second p-type transistor and a third p-type transistor coupled in series between the upper rail and the gate of the n-type power transistor, the second p-type transistor having a gate coupled to the drain of the n-type power transistor and the third p-type transistor having a gate controlled by an enable signal from an edge trigger circuit.

5. The driver circuit as recited in claim 4 wherein the edge trigger circuit is coupled to receive a first control signal from the first timing circuit and a second control signal from a second driver circuit coupled to the second n-type power transistor and to turn the enable signal ON when the second n-type power transistor is turned OFF and to turn the enable signal OFF when the first p-type transistor is turned ON.

6. The driver circuit as recited in claim 5 further comprising a logic gate coupled to turn ON the n-type transistor only when the enable signal is OFF and the adjustable pulse is OFF.

7. The driver circuit as recited in claim 6 wherein the first timing circuit is further coupled to receive the clock signal, to turn OFF the adjustable pulse based on the given edge of the clock signal and to adjust the length of the adjustable pulse responsive to the counter value.

8. The driver circuit as recited in claim 7 wherein the clock signal is recovered from zero crossings of the current on the first terminal of the miniaturized transformer.

9. An electronic device comprising:
    a miniaturized transformer configured to operate at a very high frequency (VHF) and having a first side and a second side, each of the first and second sides having a first terminal and a second terminal;
    a first H-bridge circuit on the first side of the transformer, the first H-bridge circuit comprising a first n-type power transistor having a drain coupled to the first terminal on the first side and a second n-type power transistor having a drain coupled to the second terminal on the first side;
    a first adaptive timing control circuit coupled to drive the first n-type power transistor; and a second adaptive timing control circuit coupled to drive the second n-type power transistor;

the first adaptive timing control circuit comprising:

a first p-type transistor and an n-type transistor coupled between an upper rail and a lower rail, an output taken between the drains of the first p-type transistor and the n-type transistor being coupled to a gate of the first n-type power transistor;

a sample-and-hold capacitor coupled to capture a drain voltage for the first n-type power transistor when the first n-type power transistor is turned OFF;

a comparator coupled to compare the captured drain voltage to a lower rail on a given edge of a clock signal and to provide a comparator value;

an up/down counter coupled to receive the comparator value, to adjust a counter value responsive to receiving the comparator value and to output the counter value; and a first timing circuit coupled to receive the counter value and to send an adjustable pulse towards a gate of the first p-type transistor and a gate of the n-type transistor.

10. The electronic device as recited in claim 9 further comprising:

a second H-bridge circuit on the second side of the transformer, the second H-bridge circuit comprising a third n-type power transistor having a drain coupled to the first terminal on the second side and a fourth n-type power transistor having a drain coupled to the second terminal on the second side;

a third adaptive timing control circuit coupled to drive the third n-type power transistor; and a fourth adaptive timing control circuit coupled to drive the fourth n-type power transistor.

11. The electronic device as recited in claim 9 wherein the first timing circuit comprises:

a digital-to-analog converter coupled to receive the counter value and to provide a ramp threshold; and a pulse wave modulator coupled to receive the ramp threshold and the clock signal, to reset a ramping voltage on the given edge of the clock signal and to turn ON the adjustable pulse only while the ramping voltage is greater than the threshold.

12. The electronic device as recited in claim 11 wherein the clock signal is received from a clock.

13. The electronic device as recited in claim 9 wherein the first adaptive timing control circuit further comprises:

a second p-type transistor and a third p-type transistor coupled in series between the upper rail and the gate of the n-type power transistor, the second p-type transistor having a gate coupled to the drain of the n-type power transistor and the third p-type transistor having a gate controlled by an enable signal from an edge trigger circuit.

14. The electronic device as recited in claim 13 further wherein the edge trigger circuit is coupled to receive a first control signal from the first timing circuit and a second control signal from the second adaptive timing control circuit coupled to the second n-type power transistor and to turn the enable signal ON when the second n-type power transistor is turned OFF and to turn the enable signal OFF when the first p-type transistor is turned ON.

15. The electronic device as recited in claim 14 further comprising a logic gate coupled to turn ON the n-type transistor only when the enable signal is OFF and the adjustable pulse is OFF.

16. The electronic device as recited in claim 15 wherein the first timing circuit is further coupled to receive the clock signal, to turn OFF the adjustable pulse based on the given edge of the clock signal and to adjust the length of the adjustable pulse responsive to the counter value.

17. The electronic device as recited in claim 16 wherein the clock signal is recovered from zero crossings of the current on the first terminal of the miniaturized transformer.

18. The electronic device as recited in claim 9 wherein the first H-bridge circuit is a full bridge circuit.

19. The electronic device as recited in claim 9 wherein the electronic device is a DC-DC converter.

* * * * *